United States Patent [19]

Baranyai et al.

[11] Patent Number: 4,575,845

[45] Date of Patent: Mar. 11, 1986

[54] TIME DIVISION MULTIPLEX CONFERENCER

[75] Inventors: Lawrence Baranyai, Howell; John R. Colton, Freehold, both of N.J.

[73] Assignee: AT&T Bell Laboratories, Murray Hill, N.J.

[21] Appl. No.: 647,910

[22] Filed: Sep. 6, 1984

[51] Int. Cl.[4] .............................................. H04Q 11/04
[52] U.S. Cl. .................................... 370/62; 179/18 BC
[58] Field of Search ....................... 370/62; 179/18 BC

[56] References Cited

U.S. PATENT DOCUMENTS

| | | | |
|---|---|---|---|
| 4,119,807 | 10/1978 | Nahay | 370/62 |
| 4,190,742 | 2/1980 | Southard | 370/62 |
| 4,190,744 | 2/1980 | Frank | 370/62 |
| 4,298,977 | 11/1981 | Abbott et al. | 370/62 |
| 4,477,897 | 10/1984 | Lane | 179/18 BC |
| 4,481,624 | 11/1984 | Baranyai et al. | 370/62 |

Primary Examiner—Douglas W. Olms
Assistant Examiner—Kenneth I. Rokoff
Attorney, Agent, or Firm—John K. Mullarney

[57] ABSTRACT

A time division multiplex conferencer for continuously summing and outputting digital message samples received from n subscribers in n respective time slots. Message samples collected from each subscriber of a conference connection are summed during a first time frame and outputted during a second time frame. The conferencing is carried out in real time under common control to provide one or more conference-type connections between two or more subscribers. The conferencer also has the ability to establish transmit-only or receive-only connections for one or more subscribers. The conferencing is conducted in a manner that is completely independent of time slot assignments within a frame.

4 Claims, 7 Drawing Figures

TIME DIVISION MULTIPLEX CONFERENCER

TECHNICAL FIELD

This invention relates to a common control, time division multiplex conferencing system for establishing one or more conference-type connections between two or more subscribers without time slot assignment restrictions.

BACKGROUND OF THE INVENTION

The copending application of L. Baranyai et. al. Ser. No. 391,698, filed June 24, 1982, now U.S. Pat. No. 4,481,624, discloses a time division multiplex conferencer for continuously summing and outputting digital message samples received from n subscribers in n respective time slots. Message samples collected from each subscriber of a conference connection are summed during a first time frame and outputted during a second time frame. Besides establishing one or more conference-type connections between two or more subscribers, the conferencer also has the ability to establish broadcast and monitor connections.

In the digital conferencer of the cited Baranyai et. al. case, "prefetching" techniques are used to reduce memory requirements to allow the circuit to be integrated into a single chip. This prefetching imposes a restriction, however, which prevents time slots at the frame boundaries from participating fully in the same conference. More specifically, the adjacent time slots (i.e., time slots 0 and 255) at the frame boundaries cannot participate fully in a given conference connection. Preferably, a conferencing system should not restrict or impose any dependency on time slot assignment, i.e., conferencing should be completely independent of time slot assignments within a given frame.

SUMMARY OF THE INVENTION

It is the primary object of the present invention to thus achieve a conferencing ability that is completely independent of time slot assignments within a frame.

In accordance with the present invention, the prefetching of the earlier Baranyai et. al. case is eliminated and the accumulated or stored conference sums are accessed in real time. This, in turn, eliminates the time slot adjacency problem noted above. More specifically, improvements in the common control circuit architecture and conferencer timing remove all time slot assignment restrictions and yet the reduced memory and single chip advantages of the earlier Baranyai et. al. case are retained.

When the digital message of a time slot is to be added to an accumulated conference sum, the common control circuit serves to fetch directly the sum from an accumulator (RAM) store, the digital message of the time slot is then added to the fetched sum to form a new conference sum, and this new sum is placed back in memory in the same address—all in the very same time slot. The operation is carried out in real time under common control to provide one or more conference-type connections between two or more subscribers. And, since prefetching is dispensed with, no condition can exist in the system whereby a digital signal might be lost due to the phase relationship of the memory read/write cycles.

BRIEF DESCRIPTION OF THE DRAWINGS

The invention will be more fully appreciated from the following detailed description when the same is considered in connection with the accompanying drawings, in which:

FIG. 6 shows the manner in which FIGS. 2 and 3 should be arranged; and

DETAILED DESCRIPTION

Figure 1:
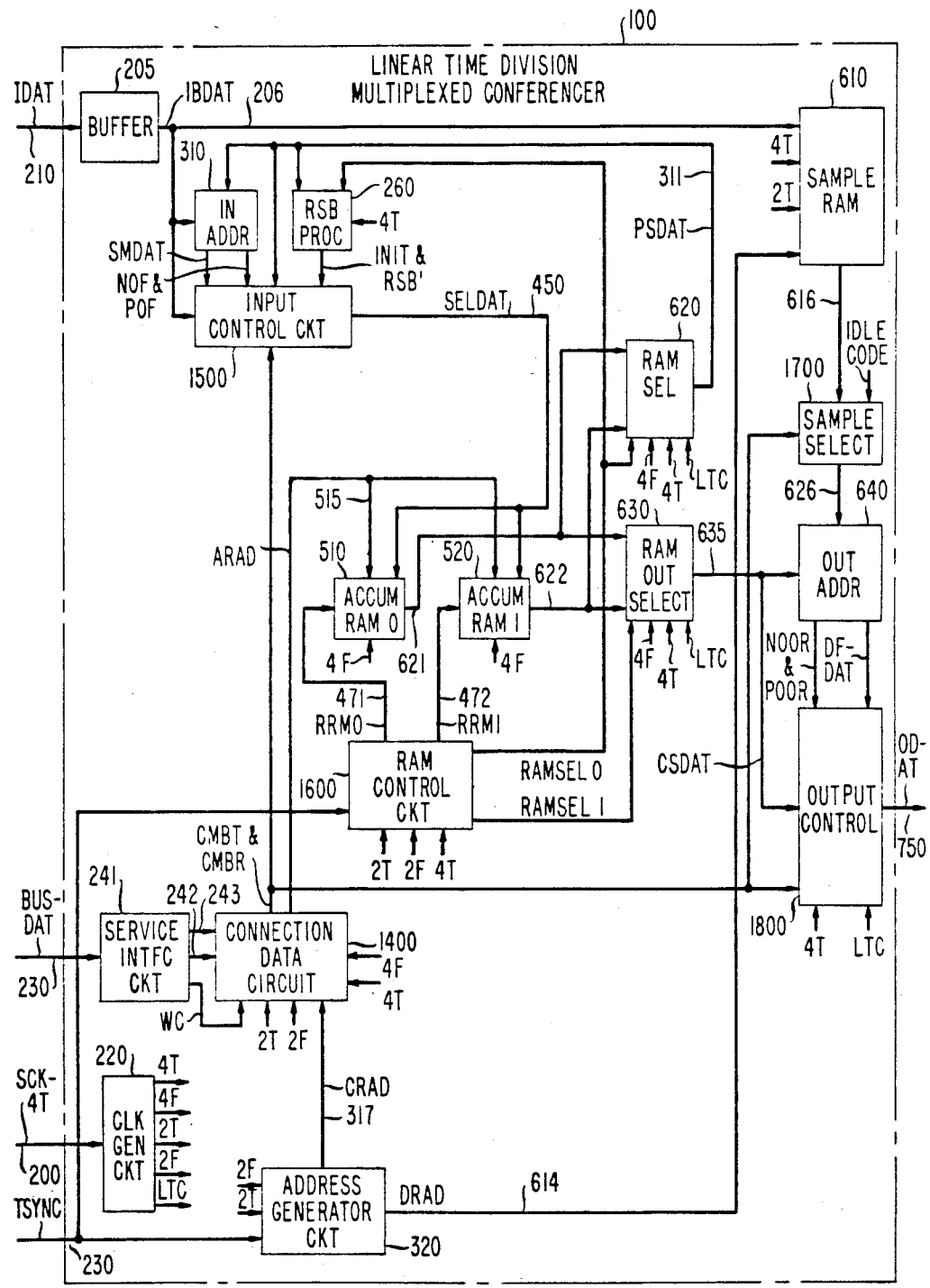
FIG. 1 is a schematic block diagram of the digital conferencer of the present invention.

A brief overview of the conferencing system will now be given with respect to FIG. 1 which shows an example of a linear time division multiplexed conferencer 100 in which the time slot input first passes through buffer 205 to twos complement adder 310 which performs the addition of linearly encoded incoming voice or data samples and passes these summed samples, as will be discussed, for storage in accumulator RAM 510 (520) respective to time slots of the same conference connection. The conferencer includes circuitry (1600) for generating and holding an accumulator RAM 510 (520) memory address respective to a time slot in which the address is used to read a summed message sample respective to a conference connection and in which the address is used to store a summed message sample in accumulator RAM 510 (520) respective to a conference connection.

The conferencer 100 may also select one of a multiple of alternate digital messages for storage in accumulator RAM 510 (520) in place of the summed message sample outputted from in-adder 310. An alternate message may be selected in response to the logic state of connection mode bits CMBT and CMBR outputted from connection data circuit 1400, in response to a positive or negative overflow condition resulting from the summation process, in response to a first access to accumulator RAM 510 (520) respective to a connection during a respective time slot frame or in response to a parity error (not shown) detected during the summation process. Twos complement out-adder 640 effectively subtracts the contribution of a time slot from the summed message prior to outputting via data bus 750. The conferencer 100 also may select an appropriate alternate digital message sample for outputting respective to a conferee (time slot). This alternate digital message sample is determined by the mode (mode control bits CMBT and CMBR) externally assigned to each respective time slot of a conference connection.

A time slot can be externally assigned to a conference mode, which permits a time slot to send and receive message samples; to a broadcast mode, which permits a time slot only to transmit message samples to the conference connection; or to a monitor mode, which permits a time slot only to receive message samples from the conference connection. The alternate message, in place of the summed message sample, is provided under the control of sample select circuit 1700 in response to the assigned mode, or under control of output control circuit 1800 in response to the time slot mode or in response to an error detected by the subtraction process performed by out-adder 640.

Each conference connection is assigned a unique accumulator RAM 510 (520) memory location (address) which is used for accumulating summed message samples contributed to by each time slot of the connection during a respective time slot frame. The assigned accumulator RAM 510 (520) memory location and mode information is stored on a per time slot basis in connection data circuit 1400. Connection data circuit 1400 is sequentially addressed by address generator circuit 320 respective to a time slot.

The memory locations associated with connection data circuit 1400 for the storage of connection data are loaded and changed via service interface circuit 241 responsive to serial input BUSDAT.

The connection data, which comprises mode bits CMBT and CMBR, and accumulator RAM 510 (520) memory location assigned to a conference connection, is the means by which respective incoming time slots are identified for connection to output bus 750.

Encoded voice samples respective to a time slot are stored in a sample RAM 610 memory location respective to a time slot address. Sequential memory addresses are provided by address generator circuit 320 respective to each incoming time slot and are applied to sample RAM 610 via address bus DRAD.

Accumulator RAMS 510 and 520 are alternately loaded with summed message samples from input control circuit 1500 and alternately unloaded for supplying summed message samples to the output. RAM control circuit 1600 in response to time frame pulse TSYNC and clock signals from clock generator circuit 220 is the means by which accumulator RAM 510 and accumulator RAM 520 are alternated between a storage cycle and a supply cycle respective to a first and a second time frame. For example, during a first time frame each time slot of a connection is sequentially addressed and its message sample (via IBDAT) is summed by in-adder 310 with summed message samples received from previously addressed lines of the conference connection during a first time frame. The new summation from input control circuit 1500 is then stored in accumulator RAM 510. Simultaneously therewith, summed message samples stored in accumulator RAM 520 during a preceding time frame are unloaded and supplied to the output via RAM select 630 and out-adder 640.

During a next time frame, summed message samples are stored in accumulator RAM 520 and simultaneously therewith, priorly summed message samples stored in accumulator RAM 510 during the preceding time frame are unloaded and supplied to the output.

The read/write addresses for accessing RAMs 510 (520) are supplied to RAM 510 and RAM 520 from connection data circuit 1400 via address bus ARAD. Accumulator RAM 510 (520), during a storage cycle, is alternately addressed each time slot for reading a summed message sample respective to a time slot and for storing a summed message sample respective to a time slot. Simultaneously therewith, accumulator RAM 520 (510) is addressed each time slot for supplying summed message samples to output bus 750.

The retrieved summed message sample(s) is inputted via select 620 to in-adder 310 via the PSDAT bus for summation with a respective incoming message sample. A reset bit (bit 16 of PSDAT) is processed by RSB processor circuit 260 for determining whether an incoming time slot of a conference connection is the first access to accumulator RAM 510 (520) for the connection respective to a time frame. If the incoming time slot is the first access to accumulator RAM 510 (520) then RSB processor circuit 260 directs input control circuit 1500 to load the message sample respective to the first accessing time slot into accumulator RAM 510 (520) in place of the summed message sample outputted from in-adder 310. In this manner accumulator RAM 510, 520 is refreshed each respective storage cycle by starting a new conference sum thereby eliminating the problem of pausing at the beginning of each time frame.

Input control circuit 1500, in response to mode control bits CMBT and CMBR or in response to an error in the summation process, selects an appropriate alternate digital message sample for storage in accumulator RAM 510 (520). For example, an alternate digital message sample is selected and stored in accumulator RAM 510 (520) for an incoming time slot assigned to the monitor mode in place of the incoming digital message sample respective to the time slot. In this manner, a time slot assigned to the monitor mode is prevented from transmitting to the conference connection.

Input control circuit 1500 also selects an appropriate alternate digital message sample for storage in accumulator RAM 510 (520) in the event a positive or negative overflow results from the summation of message samples by in-adder 310.

DETAILED DESCRIPTION (FIGS. 2 AND 3)

Figure 2:
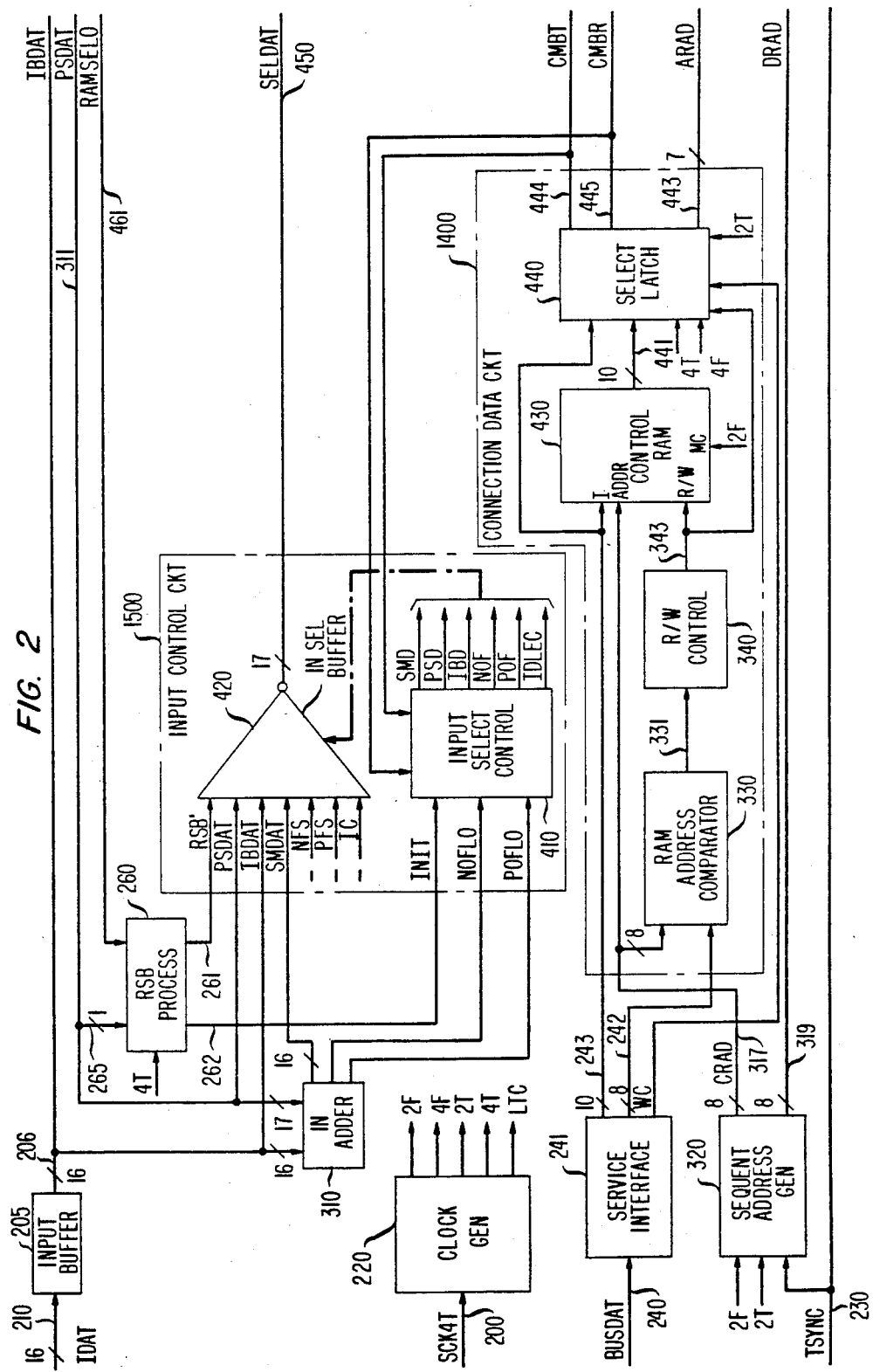
FIGS. 2 and 3, when arranged as shown in FIG. 6, show a more detailed block diagram of the conferencer of FIG. 1.
Figure 3:
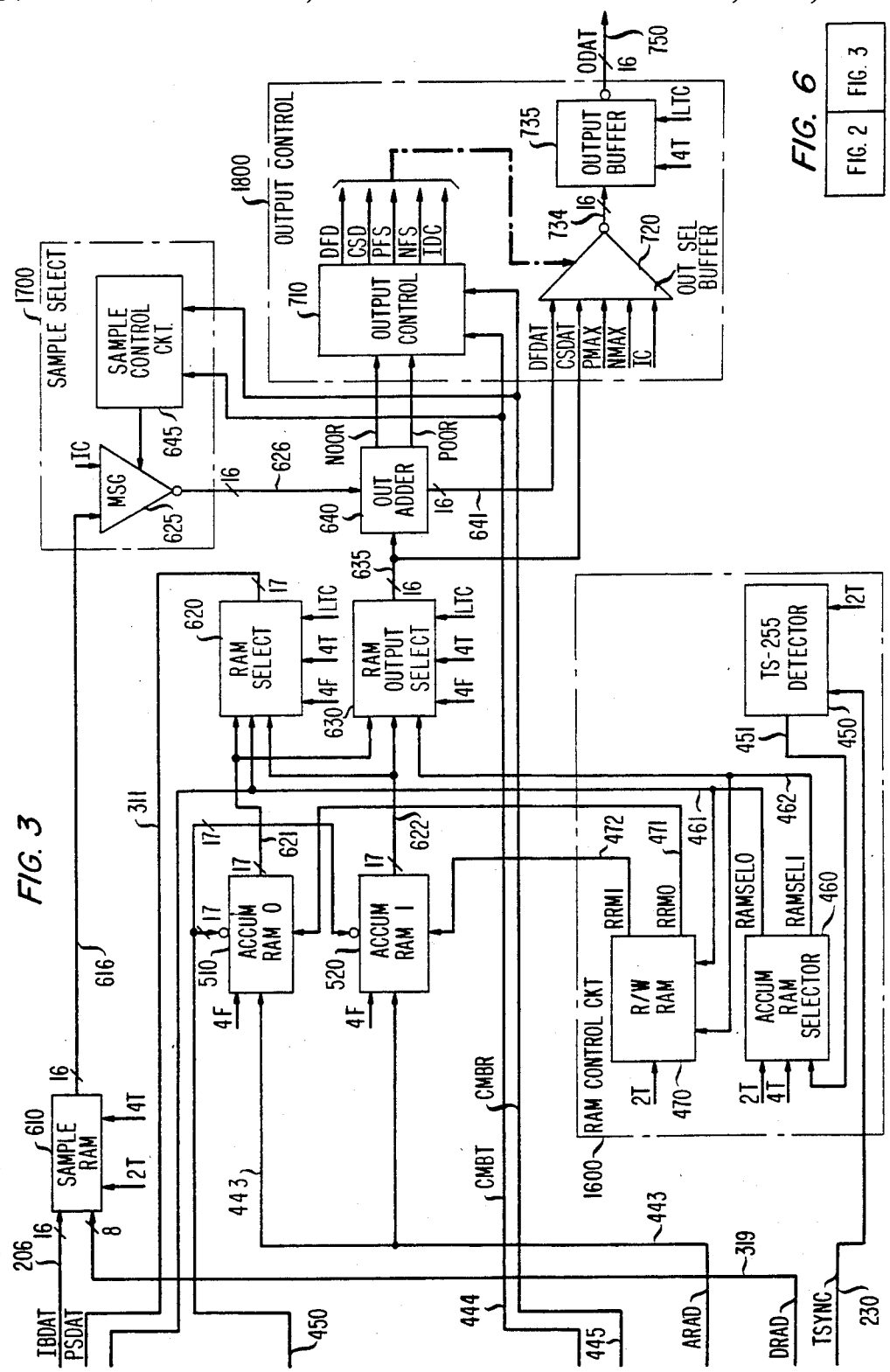

Drawing FIGS. 2 and 3, when arranged with respect to each as shown in FIG. 6, illustrate how the various elements cooperate to provide a linear time division multiplexed conferencing network. The various circuit elements are oriented with respect with each other in FIGS. 2 and 3 in a manner analogous to that of FIG. 1.

Referring to FIGS. 2 and 3, a digital input time frame having n time slots supplies at input 210 (FIG. 2) a parallel input of linearly encoded data or voice samples in two's complement format for processing by the conferencer. Thereafter, in accordance with an assigned connection mode, a time slot assigned to a connection is extended to output data bus 750 (FIG. 3).

A time frame is typically the 125 microsecond Bell System T1 carrier frame, and herein a time frame will be assumed to be 125 microseconds represented by a frame sync signal (TSYNC of FIG. 4) externally supplied via lead 230 (FIG. 2). It is also assumed that an approximately 4.095 megahertz clock signal (SCK4T) is externally supplied to clock generator 220 via lead 200 and outputted via lead 4T for operating the input and output paths synchronously with one clock signal and for division into a 2 MHz clock signal 2T (FIG. 4) outputted via lead 2T. Clock generator 220 also supplies a second 2 MHz clock signal 2F (FIG. 4) outputted via lead 2F which is an inverted non-overlapping replica of signal 2T, and a second 4 MHz clock signal 4F outputted via lead 4F which is an inverted non-overlapping replica of clock signal 4T. Clock generator 220 further supplies a third 2 MHz clock signal LTC outputted via lead LTC having a logic one state which overlaps the last quarter and first quarter of adjacent time slots to form a clock window. Clock signal LTC enables, during the window, new data to be set up on the "D" inputs to latch circuit 735 (FIG. 3) in order to update the latch on the next rising edge of clock signal 4T occurring within the LTC window, as will be discussed.

ADDRESS COUNTER

Sequential address generator 320 (FIG. 2) in response to the falling edge of clock signal 2T generates an eight bit time slot addresses (CRAD), representing time slots 0 through 255, for addressing control RAM 430 over address bus 317. In response to the rising edge of clock signal 2T, address generator 320 generates time slot addresses (DRAD) 0 through 225 for addressing sample memory 610 (FIG. 3). TSYNC is the means in which the counters are synchronized with respect to incoming time slots (IBDAT).

Figure 4:
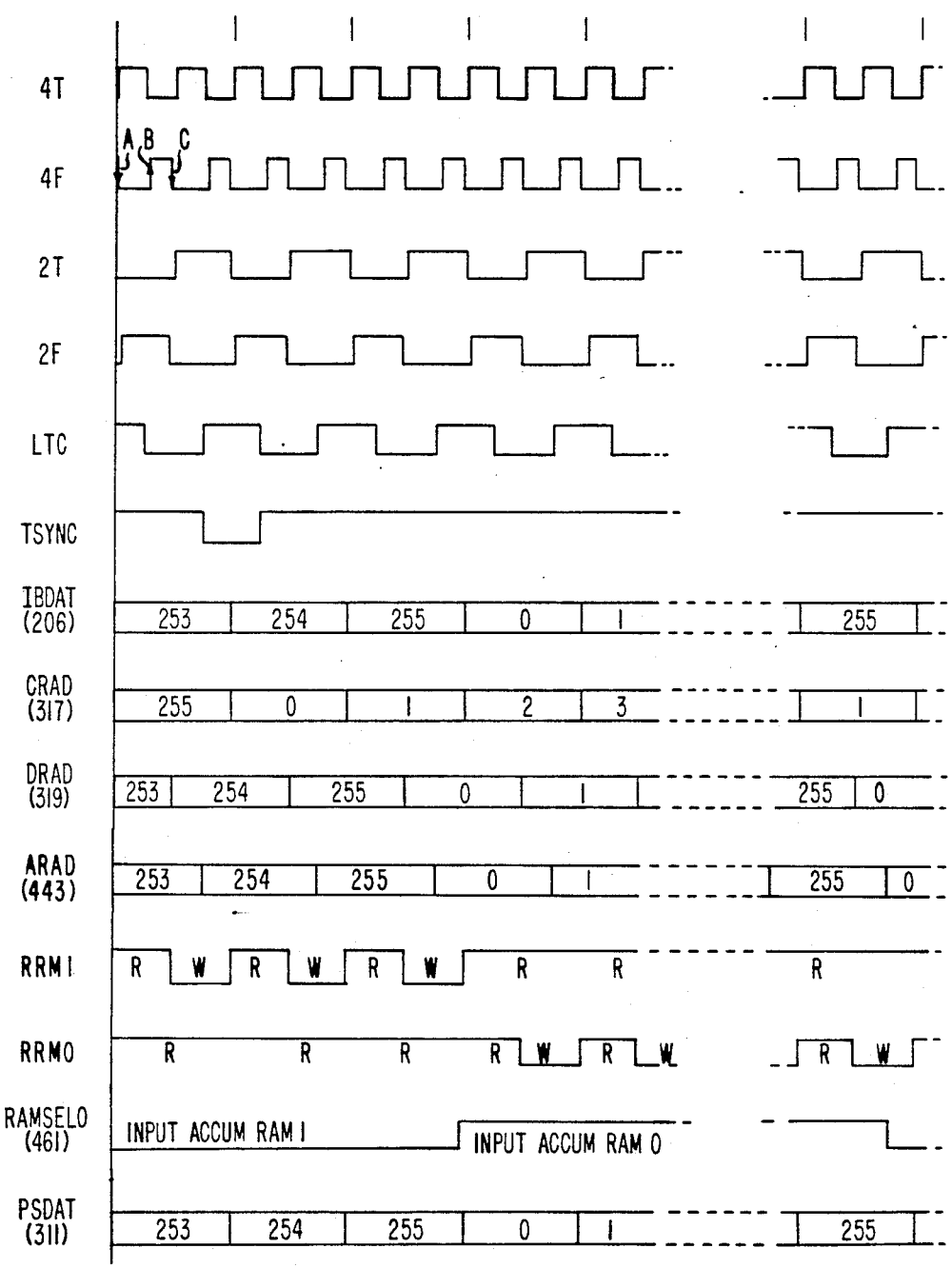
FIG. 4 shows waveforms of various clock signals, control signals, and time slot addresses with respect to a master clock signal.

Briefly referring to FIG. 4, there is shown a timing representation of time slot addresses CRAD and DRAD in which time slot address DRAD leads (starts before) incoming time slot associated with input data bus IBDAT by one-half time slot and time slot address CRAD leads incoming time slot IBDAT by two time slots. This latter sequence permits prefetching message samples from sample RAM 610 as will become more apparent further on in the detailed description.

CONTROL RAM

Returning to FIG. 2, control RAM 430 has 256 memory locations respective to incoming time slots. Time slot addresses (CRAD) sequentially generated by address generator 320 are extended to the address input of control RAM 430 over address bus 317. Control RAM 430 is the means by which selected incoming time slots from input buffer 205 are connected to output time slots at output 750. In this respect, each time slot participating in a conference connection is assigned (externally) the same memory location in accumulator RAM 510, or in accumulator RAM 520 (FIG. 3). The accumulator RAM 510 (520) memory location address assigned to a connection, mode control bits CMBT and CMBR, plus a parity bit are stored in control RAM 430 (FIG. 2) for each respective time slot of a conference connection.

The correspondence between time slot addresses and accumulator RAM 510, 520 memory locations is made external to the conferencer by a central processing unit (not shown). For example, assume that a two party call is comprised of time slots 8 and 15 respectively, and further assume that accumulator RAM 510 (520) memory location address 20 is assigned to the connection. To control the processing of the connection by the conferencer, a seven bit binary representation of address 20, plus two mode control bits, plus a parity bit is stored in memory location 8 and memory location 15 of control RAM 430.

The external central processing unit would serially transmit the connection control data, plus time slot address to service interface circuit 241 via BUSDAT lead 240 under the control of a bus synchronization pulse (not shown). Interface circuit 241 is a latched serial-to-parallel converter circuit, which extends the time slot address to address comparator circuit 330 via bus 242 and extends connection control data to control RAM 430 via bus 243.

Interface circuit 241 also includes a decoder circuit for decoding a multibit operation code appended to connection data received via lead 240. The operation code specifies whether the data sent via lead 240 is to be stored in control RAM 430 (new connection data) or is to be used for auditing or maintenance purposes (maintenance data, not shown). Service interface circuit 241 upon decoding an operation code that specifies a write to control RAM 430 changes the logic state of the wc lead to select latch 440 from a logic zero to a logic one. The logic one state extends new conference information to processing circuitry while the respective control RAM 430 memory location is being updated, as will be discussed shortly.

Address comparator circuit 330 compares the time slot address on bus 242 against time slot address CRAD (Control RAM ADdress) contained on bus 317. When the time slot addresses on bus 242 and bus 317 compare, address comparator 330 causes R/W control circuit 340 via lead 331 to switch control RAM 430 from the read state to the write state via lead 343. On the falling edge of clock pulse 2F the connection control data on bus 243 is caused to be written into control RAM 430 respective to the time slot address on address bus 317.

With respect to the above example, in which time slots 8 and 15 were assigned accumulator RAM 510 (520) memory location 20, the external central processing unit establishes connection control as follows: first, time slot address 8 and accumulator RAM 510 (520) address 20, together with the mode control bits and a parity bit are serially transmitted by an external processor over lead 240 for acceptance by interface circuit 241. Interface circuit 241 converts the data to a first parallel output on bus 242 (time slot address) and a second parallel output on bus 243 (accumulator RAM address 20, mode bits plus parity); second, when address counter 320 generates time slot address 8, the R/W control circuit 340 in response to comparator circuit 330 causes the connection control data on bus 243 to be written into address 8 of control RAM 340 on the falling edge of the 2F pulse; third, the same procedure is then executed for time slot 15 completing the sequence for establishing conference connection data for the connection.

As discussed above, the connection control data stored in control RAM 430 for each time slot of a connection includes: the address of a location in accumulator RAM 510 (520) assigned to the connection; two mode control bits and a parity bit. In the illustrative embodiment disclosed herein, it is assumed that the two mode control bits, CMBT and CMBR, are in accordance with the following table definitions:

TABLE 1

| CMBR | CMBT | FUNCTION |
|---|---|---|
| 0 | 0 | Data Connection |
| 0 | 1 | Broadcast Connection |
| 1 | 0 | Monitor Connection |
| 1 | 1 | Conference Connection |

In accordance with the definitions described by Table 1, mode control bit CMBT set to the logic one state declares a broadcast or transmit connection in which a time slot has permission to transmit messages to a conference connection. Mode control bit CMBR set to the logic one state declares a monitor or receive connection in which a time slot has permission to receive messages from a conference connection.

A single mode control bit set to logic zero prevents a time slot from having access to the respective function. For example, if the state of the mode control bits is 01 for a respective time slot, then that time slot can only broadcast to the remainder of the connection. When both mode control bits are set to logic one (11) a respective time slot has permission to both broadcast and receive messages from the connections. The default state of mode control (00) can be reserved for a special type of connection.

Returning to FIGS. 2 and 3, control memory RAM 430 is normally held in the read state by the R/W control circuit 340 via lead 343. Sequential time slot addresses (CRAD) for accessing respective locations of control RAM 430 are generated by address generator 320 in response to each falling edge of the 2T clock signal and are outputted via bus 317.

On the falling edge of the 2F lock signal, the eight bit time slot address (CRAD) applied to the address input of control RAM 430 via bus 317 is internally latched by control RAM 430 and a memory location represented by time slot address CRAD is read. The contents are latched into control RAM 430 output latch (internal) on the following rising edge of 2F (not shown). The connection control data respective to a time slot is passed from control RAM 430 to select latch circuit 440 via data bus 441.

SELECT LATCH

Select latch 440 is a selector followed by a register of D-type flip-flops and includes a ten bit selector for selecting data from either data bus 343 or data bus 441. During normal processing select latch 440 accepts data from bus 441. Otherwise, data is accepted from bus 243 upon initialization of a time slot via service interface circuit 241.

As discussed above, during initialization of a time slot the decoder circuit of service interface circuit 241 causes the wc lead connected to select latch 440 to go to a logic one state indicating a write to control RAM 430. Also, a comparison of address CRAD and the address of the initialized time slot address on bus 242 forces lead 343 from r/w control 340 to a logic zero state. The coincidence of a logic one state on the wc lead and a logic zero state on lead 343, both of which connect select latch 440, is reclocked by select latch 440 on the next rising edge of the 2T clock forming a window to allow select latch 440 to select data from bus 243. The new connection data on bus 243 comprises a seven bit accumulator RAM address and two mode bits (and parity). The 7-bit connection address is clocked into the register of select latch 440 in the second half of each time slot on the rising edge of the 4F clock ($\frac{3}{4}$ time slot delay). Mode bits CMBR and CMBT (and parity bit, not shown) are clocked into the register at the beginning of the next time slot (introducing a full time slot of delay).

In this manner, new connection data respective to an initialized time slot assigned to a connection is stored in control RAM 430, and simultaneously therewith, is accepted by select latch 440 for immediate use by the conferencer. Otherwise, the conferencer's access to the new connection data would be delayed on time frame. Mode control bits, CMBT and CMBR, are outputted on leads 444 and 445, respectively.

INPUT SELECT BUFFER

Input select buffer 420 (FIG. 2) is a combinational gate circuit for checking parity (not shown) and for selecting, under control of input control circuit 410, one of a multiple of alternate digital words for storage in accumulator RAM 510 (520). Inputs PSDAT, IBDAT and SMDAT are defined, respectively as, previously summed message samples removed from accumulator RAM 510 (520); inputted message sample at 206 respective to an incoming time slot; and the sum of PSDAT and IBDAT generated by in-adder 310. Alternate digital messages PFS, NFS and IDLECOE (IC) are fixed codes that are hard wired internally at input select buffer 420 and are selected at the direction of input selector control 410 for storage in accumulator RAM 510 (520). PFS is a digital two's complement representation of the maximum positive value including sign of a summed message sample, NFS is a digital two's complement representation of the maximum negative value including sign of a summed message sample, and IDLECODE (IC) represents a two's complement digital message sample of zero value.

Input select buffer 420 also includes combinatorial logic circuitry for appending (upon initialization) or changing the state of bit 16 (reset bit) of outputted date to SELDAT bus 450 for storage in accumulator RAM 510 (520). The function of the reset bit RSB' will be detailed further on in this description.

IN-ADDER

In-adder 310 is a twos-complement combinatorial circuit adder for summing incoming message samples (IBDAT) inputted via bus 206 with accumulator RAM 510 (520) previously summed message samples (PSDAT) outputted from select 620 via PSDAT bus 311 to in-adder 310. In-adder 310 includes combinational saturation logic circuitry for checking a summation for positive or negative overflow in the well-known manner, and includes combinational circuitry for performing circuit maintenance functions (not shown) at the direction of an external central processing unit (not shown).

INPUT CONTROL

Input select control 410 is alerted by in-adder 310 via either lead POFLO or lead NOFLO in the event the saturation logic circuitry contained in in-adder 310 detects a positive overflow or negative overflow resulting from a summation of message samples. Input select control circuit 410 in response to an active POFLO or NOFLO lead from in-adder 310 directs input select buffer 420, via leads POF of NOF, to select either hard wired digital message PFS or digital message NFS respective to the overflow condition for outputting to bus 450. In this manner, an excessive summed message sample is clamped to an established maximum positive (PFS) or maximum negative (NFS) value prior to storage in accumulator RAM 510 (520).

Mode control bits, CMBT and CMBR, extend from select latch 440 to input select conrol 410 over leads 444 and 445 respectively for controlling input functions at input select buffer 420 in accordance with the permissions detailed in Table 1.

A weighted binary value of zero-one (01) (broadcast) or one-one (11) (conference) for mode control bits CMBR and CMBT cause the input control circuit 410 to permit, via lead SMD, the summed message sample (SMDAT) from in-adder 310 to be gated through input buffer select circuit 420 to SELDAT data bus 450. This sequence is in accordance with the function of the mode bits since a time slot which is permitted to broadcast has its message sample summed with the message sample contributed by the remaining time slots assigned to the connection.

A time slot which has permission only to monitor a conference connection (CMBR and CMBT=01 respectively) causes input select control 410 to permit via lead PSD previously summed message samples (PSDAT) to be gated through the input select buffer 420 to SELDAT data bus 450. This sequence is in accordance with Table 1 since a time slot having permission only to monitor a conference session is denied permission to transmit to the session.

In the event a time slot has permission only to monitor a conference session, and that time slot is the first time slot of a connection to access accumulator RAM 510 (520) during a time frame, then select control circuit 410 in response to the INIT lead extended from RSB circuit 260 permits, via lead IDLEC, symbolic input IDLECODE (IC), which has a digital value of zero, to be gated through input buffer select circuit 420 to SEL-DAT data bus 450, rather than PSDAT. This sequence is in accordance with the monitor function since the accumulator RAM 510 (520) memory location assigned to the connection is initialized by loading the message sample from the first assessing time slot, which, for a time slot in the monitor mode is a digital message sample of zero value, into the assigned accumulator RAM 510 (520) memory location. In the event a first accessing time slot has permission to broadcast then IBDAT is selected for outputting to bus 450 via lead IBD from select circuit 410 to buffer circuit 420.

TABLE 2

| Select Control 410 Input | | | | | Output to Bus 450 |
|---|---|---|---|---|---|
| CMBR | CMBT | INIT | POFLO | NOFLO | OUTPUT |
| 0 | 0 | 1 | — | — | IBDAT |
| 0 | 1 | 1 | — | — | IBDAT |
| 1 | 0 | 1 | — | — | IDLECODE |
| 1 | 1 | 1 | — | — | IBDAT |
| 0 | 0 | 0 | 0 | 0 | SMDAT |
| 0 | 1 | 0 | 0 | 0 | SMDAT |
| 1 | 0 | 0 | 0 | 0 | PSDAT |
| 1 | 1 | 0 | 0 | 0 | SMDAT |
| 0 | 0 | 0 | 1 | 0 | PFS |
| 0 | 1 | 0 | 1 | 0 | PFS |
| 1 | 0 | 0 | 1 | 0 | PSDAT |
| 1 | 1 | 0 | 1 | 0 | PFS |
| 0 | 0 | 0 | 0 | 1 | NFS |
| 1 | 0 | 0 | 0 | 1 | PSDAT |
| 1 | 1 | 0 | 0 | 1 | NFS |
| 0 | 1 | 0 | 0 | 1 | NFS |

Table 2 illustrates symbolically, in a format similar to the format of the well-known truth table, the states of inputs to select control 410 that control the selection of corresponding ones of digital inputs to input select buffer 420 for gating to SELDAT bus 450.

RESET BIT PROCESSING

Input select buffer 420 appends or changes the reset bit (bit 16) of the seventeen bits of data outputted to bus 450 prior to storage in accumulator RAM 510 (520). The reset bit (bit 16) of a summed message sample is the means by which the first storage access to accumulator RAM 510 (520) is recognized respective to a conference session.

Figure 5:
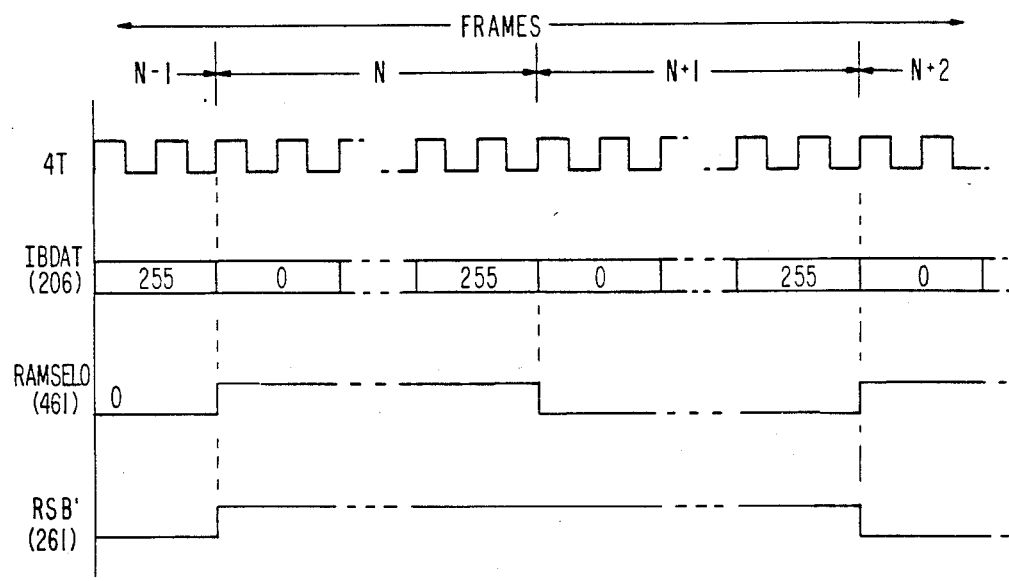
FIG. 5 comprises illustrative waveforms depicting the manner in which a reset signal is generated.

RSB processor circuit 260 is a sequential logic circuit of edge triggered flip-flops for generating reference signal RSB' on lead 261. FIG. 5 shows a symbolic representation of incoming time slots 255 and 0 occurring within three consecutive time frames N, N+1, N+2. FIG. 5 also shows signal RAMSEL0 which is clocked by the 1st rising edge of clock signal 4T during time slot 0. The generation of RAMSEL0 will be detailed further on in this description. Signal RSB' is effectively one-half the frequency of signal RAMSEL0.

Returning to FIGS. 2 and 3, RSB processor 260 includes circuitry for comparing the logic state of signal RSB' against bit 16 (Reset bit) inputted via leas 265 for each summed message sample placed on PDSAT data bus 311 via accumulator RAM 510 (520) and select 620.

Referring to FIG. 5, it is noticed that the logic state of signal RSB' changes every two time frames (N, N+2) during time slot zero. The frequency of signal RSB ensures that the reset bit (bit 16) of each summed message sample stored in accumulator RAM 510 (520) tracks the logic state of RSB for two time frames since the accumulators 510 and 520 are alternately loaded between a first and second time frame. Therefore, for time frames N and N+1 (FIG. 5) the reset bit of each summed message sample stored in accumulators 510 and 520 correspond to the logic state of signal RSB' during the respective time frames.

During time frame N+2 (FIG. 5) reset signal RSB' is toggled to the logic zero state during time slot zero and remains in that state during time frames N+2 and N+3 (not shown).

To reiterate, bit 16 (reset bit) of each summed message sample processed during time frames N and N+1 were set to a logic one corresponding to the state of signal RSB'. The reset bit and summed samples are stored in the accumulator. During time frame N+2, bit 16 of each stored summed message sample (PSDAT) is compared by RSB processor 260 against signal RSB'. If the logic state of bit 16 of a respective summed message sample and the logic state of signal RSB' do not compare then the respective time slot must be the first access to accumulator RAM 510 (520) for the respective connection. This follows, since if a prior access for this frame had occurred the stored reset bit would match signal RSB'. RSB processor 260, upon detecting a first access to accumulator RAM 510 (520), causes the INIT lead to input select control 410 to go to the logic one state. In turn, input select control 410, in accordance with Table 2, selects IBDAT or IDLECODE to be gated through input select buffer 420 for storage in accumulator RAM 510 (520) along with RSB' (bit 16). In this manner, a new input message IBDAT respective to the first accessing time slot or IDLECODE (monitor mode) is used to reset the respective assigned accumulator RAM 510 (520) memory location thereby avoiding the necessity of pausing at the beginning of each time frame in order to clear accumulator RAM 510 (520).

If the logic state of bit 16 at 265 of a summed message sample respective to a connection and the logic state of signal PSB' compare then the respective time slot is not the first access in this frame to accumulator RAM 510 (520). In this event, the logic state of the INIT lead is zero and the output from input select buffer 420, under control of input select 420, will be in accordance with Table 2.

Referring now to FIG. 5, assume that a conference connection comprising three telephone lines are assigned by an external central processing unit to time slots 0, 4 and 8 (4 and 8 not shown) respectively. Also assume that the conference connection is assigned memory location 96 of accumulator RAM 510 (520) for the storage of the connection's summed message samples. Further assume that accumulator RAM 510 is accessed for storage during even time frames (N, N+2), and that accumulator RAM 520 is accessed for storage during odd time frames (N−1, N+1). Also, assume that bit 16 (reset bit) of each summed message samples stored in accumulator RAMs 510 and 520 during time frames N−2 (not shown) and N−1 were set to logic zero corresponding to the state of signal RSB'.

Figure 7:
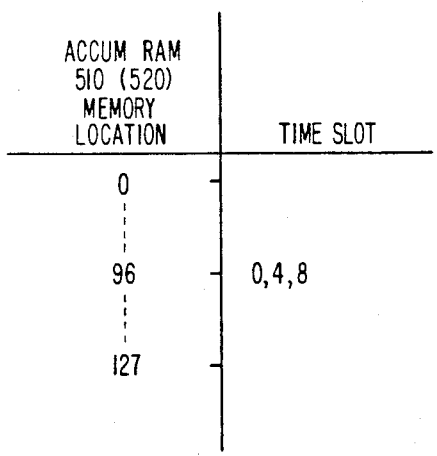
FIG. 7 is an illustration, respective to a cited example, of the manner in which a group or connection of time slots are assigned to an accumulator RAM memory location.

In accordance with the outlined assumptions, and with reference to FIGS. 5 and 7, during time slot 0 of time frame N the summed message samples priorly loaded into location 96 of even accumulator RAM 510 during time frame N−2 (not shown) is read out of the accumulator RAM and presented to select 620 (FIG. 3). Also, during time frame N, reference signal RSB' is toggled as priorly discussed to logic one state. Reset bit (bit 16) of a respective summed message sample on PSDAT bus is extended to RSB processor 260 via lead 265 for comparison with reference signal RSB'. Since the logic state of bit 16 is zero (0) and the logic state of signal RSB' is a one (1) there is a mismatch signifying a first access to memory location 96 of accumulator RAM 510 during time frame N.

The INIT lead to input select control 410 from RSB processor 260 goes to a logic one state as a result of the mismatch and directs either inputted message sample IBAT or symbolic input IDLECODE to be gated through input select buffer 420 to SELDAT bus 450 for storage in location 96 of accumulator RAM 510 thereby overwriting old data with new data. The reset bit (bit 16) of selected ones of inputs to input select buffer 420 is updated by input buffer 420 circuitry to correspond to the current logic state of signal RSB' before outputting to bus 450. In this manner, the reset bit equals signal RSB' after initial access has been recognized by RSB processor 260.

During time slot 4 of frame N the contents of location 96 of accumulator RAM 510 is again read out of the accumulator RAM and presented to select 620. The contents of select 620 is outputted to PSDAT bus for summation with an incoming message sample respective to time slot 4 by in-adder 310. Bit 16 of PSDAT bus is sampled by RSB processor 260 via lead 265 for comparison against signal RSB'. However, RSB processor 260 in this instance does not detect a mismatch since bit 16 of the summed message sample was changed during time slot 0 by input select control 410 to equal signal RSB'. As such, time slot 4 is not recognized as a first access and the summed message sample SMDAT from in-adder 310 is gated through input select buffer 420 for outputting to bus 450 for storage into location 96 of accumulator RAM 510. The recognition process that was applied to time slot 4 is also supplied to time slot 8.

During the next time frame N+1, time slot 0 is recognized as the first access to location 96 of odd accumulator RAM 520.

The recognition of time slot 0 as the first access to location 96 of accumulator RAM 520 is based on the status of bit 16 of the summed message sample stored in location 96. The last access to accumulator RAM 520 occurred during time frame N−1 in which the state of signal RSB' was zero. As noted previously, input select buffer 420 (FIG. 2) changes bit 16 to equal the state of signal RSB', which during time slot N−1 was a logic zero. Therefore, RSB processor 260 upon comparing bit 16 of the summed message sample stored in location 96 of accumulator RAM 520 against the state of signal RSB' detects a mismatch. The mismatch, as noted previously, signifies a first access. The processing of time slot zero includes changing bit 16 of summed message sample to correspond to signal RSB' to preclude recognizing time slot 4 and 8 as a first access during the N+1 time frame in the manner described above.

ACCUMULATOR RAM

Referring to FIG. 3, accumulator RAM 510 and RAM 520 are identical dynamic random access memories, each having 128 memory locations by seventeen bits, enabled by 4F clock signals. Summed message samples stored in accumulator RAM 510 (520) memory locations comprise 17 bits as follows: a summed message sample of 14 magnitude bits and a sign bit, a parity bit and a reset bit. The accumulator RAMs 510 and 520 require fast access time and, in accordance with the invention, these memories are constructed in accordance with 2.5 $\mu$m. CMOS technology.

FIG. 4 shows four transitions of clock 4F for each period of a time slot. The first falling edge of clock 4F (A) initiates an accumulator RAM 520 (510) read. This data is transferred immediately through accumulator RAM 520 (510) output latch (internal, not shown) to select 620. During the next clock phase (B), this data is stored by the output latch until the next read access is performed. During the second falling edge (C) of the 4F clock signal a summed message sample from SELDAT bus 450 is written into accumulator RAM 520 (510). This sequence is depicted by the RRM1 accumulator RAM 520 read and write sequence (FIG. 4) respective to time slot 253, which shows that a time slot is divided into two distinct operations, namely, first, reading summed message samples respective to a time slot (253) and second, storing a summed message sample respective to a time slot (253) during the time period in which RAMSEL0 is a logic zero.

TS-255 (TIME SLOT) DETECTOR

TS-255 Detector 450 FIG. 3 is a circuit arranged for detecting the occurrence of incoming time slot 255 respective to system frame sync signal TSYNC (FIG. 4), which occurs once each time frame and which overlaps time slots 253 and 254 as a means of signifying an approaching end to a respective time frame. Signal TSYNC applied at lead 452 is toggled and clocked into the first D-type flip-flop of detector 450 on the falling edge of clock signal 2T occurring at the end of time slot 253. TSYNC is then clocked into a second D-type flip-flop of TS detector 450 on the falling edge of clock signal 2T occurring at the beginning of IBDAT time slot 255 and is outputted as signal TS255' on lead 451. Signal TS255' on lead 451 is time representative of incoming time slot 255.

RAM SELECTOR

Accumulator RAM 510 (520) selection circuit 460 is a sequential circuit for generating clock signal RAMSEL0 at lead 461. Clock signal RAMSEL1 at lead 462 is a complement of signal RAMSEL0.

Clock signal RAMSEL0 and RAMSEL1 at lead 461 and 462 respectively are the means for alternating accumulator RAM 510 (520) between a storage cycle during a first time frame and a supply cycle during a second time frame. RAM select signal RAMSEL0 is outputted at lead 461 to RAM r/w circuit 470 and at a logic one state (high) during a first time frame selects accumulator RAM 510 for storage of summed message samples outputted from input select buffer 420 via SELDAT bus 450. RAM select signal RAMSEL0 at the logic zero state selects accumulator RAM 510 for supplying summed message samples for outputting via data bus 750. RAM select signal RAMSEL1 outputted at lead 462 to RAM r/w circuit 470 and at the logic one state selects accumulator RAM 520 for the storage of message samples and at the logic zero state selects accumulator RAM 520 for supplying summed message samples to leads 750.

Clock signal RAMSEL0 at lead 461 is toggled by the occurrence of signal TS255' extended from TS-255 detector 450 via lead 451, and the first rising edge of clock signal 4T occurring during time slot 0.

RAM READ/WRITE

Referring to FIG. 4, in particular to time sequence RRM1, it is shown that each time slot is apportioned into a read (R) cycle for first retrieving a summed message sample respective to a time slot and a write cycle for storing summed message samples into accumulator RAM 520 respective to a time slot. Signals RRM0 and RRM1 are the means by which a time slot is apportioned into a read cycle and a write cycle.

Returning to FIG. 3, RAM READ/WRITE circuit 470 is a combinational circuit comprised of AND and NAND gates for generating accumulator RAM 510 (520) READ/WRITE signals RRM0 and RRM1 at leads 471 and 472 respectively. Signals RRM0 amd RRM1 at leads 471 and 472 respectively are inverted replicas of clock signal 2T for the accumulator RAM 510 (520) in the storage cycle. Select signal RAMSEL0 (RAMSEL1) at the logic zero state and inputted via lead 461 (462) disenables circuitry associated with RAM read/write circuit 470 and forces the output at lead 471 (472) to a logic one state, or RAM read state for the accumulator RAM 510 (520) in the supply cycle. Conversely, select signal RAMSEL0 (RAMSEL1) at the logic one state enables RAM read/write circuitry 470 thereby causing the circuitry to output at lead 471 (472) an inverted replica of clock signal 2T. Since select signals RAMSEL0 and RAMSEL1 are logical complements, either signal RRM0 or signal RRM1, but not both, is enabled during a respective time frame. Read/Write control signals RRM0 and RRM1 also connect to accumulator RAM 510 (520) via leads 471 and 472 respectively.

RAM SELECT

RAM select 620 alternates under control of the RAMSEL0 clock between receiving summed message samples from accumulator RAM 510 (520). Referring to FIG. 3, RAM select 620 receives via data bus 621 summed message samples from accumulator RAM 510 when the RAMSEL0 lead 461 is a logic one and receives via data bus 622 summed message samples from accumulator RAM 520 when RAMSEL0 lead 461 is a logic zero. A summed message sample stored in select 620 is presented both to in-adder 310 via bus 311 for summing with an incoming message sample (IBDAT) on bus 206, and to input select buffer 420 as discussed previously.

RAM OUTPUT SELECT

RAM output select 630, which is similar to select 620, alternates under control of the RAMSEL1 clock signal at lead 462 between receiving summed message samples from accumulator RAM 510 (520). When RAMSEL1 clock at lead 462 is a logic one, RAM output select 630 receives via bus 621 summed message samples from accumulator RAM 510 for outputting to out-adder 640 via the CSDAT data bus 635. RAMSEL1 clock signal at the logic zero state switches the input of RAM output select 630 to accumulator RAM 520 for receiving summed message samples via data bus 622.

SAMPLE RAM MEMORY

As shown in FIG. 4, time slot address DRAD generated by address generator 320 on bus 319 leads a respective incoming IBDAT time slot by one-half time slot and is applied to the memory address input of sample RAM 610 (FIG. 3) for prefetching a previously stored message sample respective to the incoming time slot of a previous time frame prior to the storage of the incoming digital message sample of a current frame. The 2T clock signal directs the read/write cycle of sample RAM 610 respective to clock signal 4T.

Continuing in FIG. 4, for example, time slot address (DRAD) 254 precedes and overlaps incoming time slot (IBDAT) 254 by one-half time slot and is applied to sample memory RAM 610 via bus 319. The occurrence of clock signal 2T at the logic one state and the second falling transition of clock signal 4T during IBDAT time slot 253 causes memory location 254 to be read and the contents stored in sample RAM 610 output latch (internal, not shown) on the following rising edge of 4T (not shown) for processing by out-adder 640 via message sample gate (MSG) 625. During IBDAT incoming time slot 254, the occurrence of clock signal 2T in the logic zero state and the first falling transition of clock 4T causes a new message sample respective to time slot 254, extended from bus 206, to be stored in memory location 254 of sample memory RAM 610. The prefetched message sample respective to time slot 254 held in sample RAM 610 output latch is then applied to message sample gate 625 via data bus 616 during time slot 254.

MESSAGE SAMPLE GATE

Message sample gate 625 is a 16 bit combinatorial logic circuit under control of sample control circuit 645 for inverting and gating to bus 626 either message samples outputted from sample RAM 610 or digital message IDLECODE, which is internally generated by message sample gate 625.

SAMPLE CONTROL CIRCUIT

Sample control circuit 645 is a combinatorial logic circuit similar to input control circuit 410 for controlling message sample gate 625 in accordance with the permissions established by the logic state of mode control bits CMBT and CMBR inputted via leads 444 and 445 respectively. Maintenance signals (not shown) are also inputted to sample control circuit 645 for exercising the conferencer.

Sample control circuit 645 selects alternate message IDLECODE to be generated and gated through gate 625 for time slots assigned to the monitor mode. A time slot in the monitor mode has permission to only monitor a conference connection and therefore, message samples transmitted by the respective time slot are not permitted to be operative on the conference summed messaged outputted at 750.

Sample control circuit 645 is operative for selecting a message sample on bus 616 to be gated through gate 625 to data bus 626 when the logical state of the mode control bits CMBR and CMBT inputted via leads 644 and 645 respective to a time slot is either 01 (broadcast) or 11 (conference). A message sample contributed by a time slot in either the broadcast or conference mode is summed at the input by in-adder 310 with message samples contributed by other time slots assigned to the connection and stored in accumulator RAM 510 (520), and therefore, its message sample is allowed to be operative on outputted message samples. Whereas, a monitoring time slot is silent and its message contribution is not summed by in-adder 310 with the conference summed message sample. Therefore, the message sample of a monitoring time slot is not permitted to be operative on summed message samples supplied to output 750.

OUT-ADDER

Out-adder 640 is a twos-complement combinatorial logic circuit similar in circuitry to in-adder 310. Out-adder 640 includes saturation logic circuitry for detecting positive overflow or negative overflow as a result of summing a summed message sample inputted from output select 630 via data bus 635 with an inverted message sample from gate circuit 625 via bus 626. Since a message sample inputted via bus 626 is an inverted replica of the message sample previously stored in sample RAM 610, it is essentially subtracted by out-adder 640 from the summed message sample inputted via bus 635 by the twos-complement addition. A message sample respective to a time slot is effectively subtracted in this manner from the summed message sample to eliminate its message contribution from the summed message before the summed message sample is outputted to the respective time slot at output 750. This circuit sequence ensures that sidetone is not transmitted to a respective time slot, since sidetone is provided by local telephone apparatus.

Out-adder 640 notifies output select circuit 710 via leads POOR or NOOR in the event either positive or negative overflow occurs as a result of summing an inputted summed message sample from bus 635 with a respective message sample inputted from bus 626.

OUTPUT BUFFER

Output select buffer 720 is a combinatorial logic circuit similar in circuitry to input select buffer 420, and is under control of output control circuit 710. Output select buffer 720 includes circuitry (not shown) for generating parity (not shown) over selected inputs outputted to output buffer 735 via data bus 734, and includes combinatorial circuitry for performing circuit maintenance functions (not shown) at the direction of an external central processing unit (not shown).

Inputs DFDAT and CSDAT to output select buffer 720 represent respectively the output from out-adder 640 via bus 641 and the output from select 630. CSDAT is the cumulative conference message sample from accumulator RAM 510 (520) and includes the message sample contribution of the respective time slot. DFDAT is the cumulative conference message sample less the message sample contribution of the respective time slot. Alternate digital messages PMAX, NMAX and IDLECODE are also generated internally by output buffer 720 and were defined previously. Output select buffer 720 generates additional alternate digital messages (not shown) in response to circuit maintenance requests.

OUTPUT CONTROL CIRCUIT

Output control circuit 710 is a combinational logic circuit similar in circuitry to input control circuit 410 for controlling the outputting of selected ones of inputs to output select buffer 720. The outputs from output select control 710 correspond to respective inputs to output select buffer 720.

TABLE 3

| Output CMBR | Select CMBT | Control POOR | Input NOOR | Output to Bus 734 |
|---|---|---|---|---|
| 0 | 0 | — | — | CSDAT |
| 0 | 1 | — | — | IDLECODE |
| 1 | 0 | 0 | 0 | DFDAT |
| 1 | 1 | 0 | 0 | DFDAT |
| 1 | 0 | 0 | 1 | NMAX |
| 1 | 0 | 1 | 0 | PMAX |
| 1 | 1 | 0 | 1 | NMAX |
| 1 | 1 | 1 | 0 | PMAX |

Table 3 illustrates symbolically, in a format similar to the format of the well-known truth table, the states of inputs to output select control 710 which in turn control the selection of corresponding ones of inputs to output buffer 720 for gating to bus 734.

In response to a positive or negative overflow signal from out-adder 640, via leads POOR or NOOR respectively, output select control circuit 710 directs output select buffer 720, via leads PFS and NFS respectively, to output alternate digital messages PFS (PMAX) or NFS (NMAX) to bus 734 respectively. IDLECODE is outputted by output buffer select 720 at the direction of output control circuit 710 via lead IDLC whenever the respective time slot has permission only to broadcast (mode control bits=01) to a conference session. IDLECODE is selected for outputting in accordance with Table 3 in this instance to ensure that a respective broadcast only time slot does not receive digital message samples from the conference session. Output select control 710 directs, via lead DFD, output buffer 720 to gate through the output (DFDAT) from out-adder 640 extended to output buffer 720 via DFDAT data bus 641, to respective time slots having permission to receive (CMBR=1) summed message samples from the conference session in the absence of overflow.

OUTPUT BUFFER

Output select buffer 720 extends the selected digital message sample to output buffer 735 via bus 734.

Output buffer 735 is a sequential circuit arrangement of master-slave flip-flops in which data on bus 734 is clocked into the master stage of output buffer 735 on the falling edge of the 4T clock within the LTC enable window; the contents of the master register is clocked into the slave register on the first rising edge of clock signal 4T within the LTC enable window for outputting to sixteen parallel bit bus 750.

The progression of a digital message sample through output latch 735 is arranged in accordance with clock signal 4T to allow an outputted message sample to be available for the full period of a time slot, instead of a portion of a time slot. Therefore, in accordance with this arrangement, an outputted message sample via data bus 750 lags the incoming (next) time slot (IBDAT) by one time slot. For example, a summed message sample respective to time slot 254 is available at output 750 at the start of input time slot 255.

A substitution of the master-slave register arrangement with standard flip-flops permits the output to be available via data bus 750 during the respective time slot.

What is claimed is:

1. A digital conferencing system for establishing one or more conference-type connections between two or more subscribers, the digital message samples of said subscribers occupying separate and distinct time slots of an incoming repetitive frame, comprising means for selectively summing said message samples from predetermined groups of said time slots, first storage means having a plurality of memory locations for respectively storing each of said summed message samples accepted during a first time frame and for supplying the stored summations during the next time frame, second storage means having a plurality of memory locations for respectively storing each of said summed message samples accepted during said next time frame and for supplying the stored summations during the succeeding time frame, the write in to and read out from said first and second storage means being carried out in a continuous alternate manner, common control means for selectively fetching from said first or second storage means during an individual time slot within a frame summed message samples priorly stored for a group and delivering the same directly to said message sample summing means, said message sample summing means combining message samples received with respect to any time slot of a group of time slots with said fetched priorly stored summed message samples respective to said group, said common control means including means for accessing said storage means such that all of the time slots of a frame can participate fully in a conference connection between time slots of a group including the time slots at the frame boundaries, third storage means having a plurality of memory locations for respectively storing message samples respective to said time slots, means for fetching a priorly stored message sample from said third storage means respective to a time slot prior to storing a new message sample respective to that time slot, and means for subtracting the fetched message sample of said third storage means from a respective supplied summed message sample prior to supplying the difference to an output terminal.

2. A digital conferencing system for establishing one or more conference-type connections between two or more subscribers, the digital message samples of said subscribers occupying separate and distinct time slots of an incoming repetitive frame, comprising means for selectively summing said message samples from predetermined groups of said time slots, first storage means having a plurality of memory locations for respectively storing each of said summed message samples accepted during a first time frame and for supplying the stored summations during the next time frame, second storage means having a plurality of memory locations for respectively storing each of said summed message samples accepted during said next time frame and for supplying the stored summations during the succeeding time frame, the write in to and read out from said first and second storage means being carried out in a continuous alternate manner, common control means for selectively fetching from said first or second storage means during an individual time slot within a frame summed message samples priorly stored for a group and delivering the same directly to said message sample summing means, said message sample summing means combining message samples received with respect to any time slot of a group of time slots with said fetched priorly stored summed message samples respective to said group, said common control means including means for accessing said storage means so that the conferencing of the time slots of a group is independent of the time slot assignments within said frame and adjacent time slots at the frame boundaries can participate fully in a given conference, third storage means having a plurality of memory locations for respectively storing message samples respective to said time slots, means for fetching a priorly stored message sample from said third storage means respective to a time slot prior to storing a new message sample respective to that time slot, means for subtracting the fetched message sample of said third storage means from a respective supplied summed message sample prior to supplying the difference to an output terminal, means for alternatively establishing a transmission-only mode or a receive-only mode for each respective time slot, said message sample summing means including means for detecting a positive overflow or a negative overflow resulting from the summing of said message samples, and means responsive to the overflow means and the mode establishing means for selectively storing in said first or second storage means one of a multiple of alternate message samples in place of said summed message samples with respect to a group of time slots.

3. A digital conferencing system as defined in claim 2 wherein said common control means serves to access said storage means in real time.

4. A digital conferencing system as defined in claim 3 wherein said first and second storage means comprise dynamic random access memories constructed in accordance with 2.5 micron CMOS technology.

* * * * *